United States Patent [19]

Rantala

[11] Patent Number: 5,052,233
[45] Date of Patent: Oct. 1, 1991

[54] METHOD AND APPARATUS FOR MEASUREMENT OF WEB TENSION

[75] Inventor: Esko Rantala, Kauniainen, Finland

[73] Assignee: Valmet Paper Machinery Inc., Helsinki, Finland

[21] Appl. No.: 377,277

[22] Filed: Jul. 10, 1989

[30] Foreign Application Priority Data

Sep. 14, 1988 [FI] Finland .................................. 884236

[51] Int. Cl.$^5$ ................................................ G01L 5/08
[52] U.S. Cl. .................................. 73/862.45; 73/37.7
[58] Field of Search ............... 73/862.45, 37.9, 862.47, 73/862.48

[56] References Cited

U.S. PATENT DOCUMENTS 2,755,032 7/1956 Justus ..................................... 242/75
3,057,574 10/1962 Justus ................................ 242/75.43

FOREIGN PATENT DOCUMENTS 62419 8/1982 Finland .

*Primary Examiner*—Donald O. Woodiel
*Attorney, Agent, or Firm*—Birch, Stewart, Kolasch & Birch

[57] ABSTRACT

In a method and apparatus for measuring web tension, the tension of a moving web is measured by locating close to the web (14) a gauging bar (1), which has its outer surface curved in the machine direction of the web (14) and carries pressure measurement sensors (2) in holes (3) formed into the bar. An air-cushion is formed between the moving web (14) and the curved surface, wherein the pressure is proportional to the tension of the web (14). The tension of the web (14) is measured in an indirect way by gauging the air-cushion pressure. The apparatus capable of implementing the method has an apparatus (7) required for the generation of a reference pressure, and the pressure measurement apparatus is used for measuring the pressure difference between said reference pressure and the air-cushion pressure.

13 Claims, 3 Drawing Sheets

METHOD AND APPARATUS FOR MEASUREMENT OF WEB TENSION

BACKGROUND OF THE INVENTION

The present invention relates to a method for the measurement of web tension.

The present invention also concerns an apparatus for the implementation of the method.

When a web, e.g., a paper web, is conveyed from one roll to another, the rotation speeds and consequently, the rotating torques of the roll drives must be controlled in a proper relation to each other, since the diameter of the rotated roll is linearly related to the tangential speed at the roll perimeter. In order to make it possible to wind the web onto the roll so that the web tension is maintained proper throughout the entire roll thickness and to be able to wind the web from one roll to another so that the web will not be slackened or tightened excessively with resultant breaks, the web tension must be measured during the wind/unwind operation and the rotation speeds of rolls adjusted according to the measured tension. The tension measurement apparatus also quickly indicates web breaks.

Conventional methods used for web tension measurement are the following:

Web tension measurement can be implemented using the method illustrated in FIG. 1a, in which compressed air is blown against the web at constant pressure and the web is conveyed over the gauging probe. The gauging probe is provided with a hole, in which the induced pressure is proportional to the web tension, whereby information on web tension can be obtained from this pressure. This method is inaccurate and requires the gauging probe to be located in such a place within the machine that allows the web to be conveyed at a substantially acute angle over the gauging probe, to allow a sufficient measurement counterpressure to be formed. This kind of an acute deflection in the web transport direction imposes a stress on the web and increases its tendency to break.

Further, web tension can be measured by pressing against the web in a transverse direction to its machine direction, for instance, using a freely riding roller as illustrated in FIG. 1b. Because in this manner a force component related to the web tension and the forced change in the web direction is imposed on the web, the web tension can be measured by placing a strain gauge at a suitable place, e.g. at the middle of the support beam span of the measurement roller, or alternatively, at the end of the roller. If the strain components of the roller support structure are defined with a high accuracy for different stress conditions, the result obtained is accurate. In other aspects, this system inherently bears the same drawbacks as the first method described.

The FI patent publication 62419 discloses a measurement method based on the propagation velocity of a planar wave as illustrated in FIG. 1c. According to this method, a disturbance is excited on the web, which in this case is an acoustic wave generated with the help of a loudspeaker; and the wave propagation time is measured with a microphone. The propagation velocity of the disturbance is related to the tension of the web, which provides for the determination of web tension when the other factors such as the base weight, temperature and Young's modulus stay constant. Because of the acoustic method used, interference from industrial building noise and other exiting disturbance will cause error in the measurement result.

U.S. Pat. Nos. 2,755,032 and 3,057,574 describe mechanical and compressed-air operated apparatus for web tension measurement and control. According to these methods, the web is pressed by two pads, whereby the web is deflected and a force proportional to the web tension is imposed on the pads. The mechanical measurement systems of web tension impose a heavy load on the web and, consequently, are not suitable for modern web processing machines of high speed. An embodiment of such apparatus is illustrated in FIG. 1d.

SUMMARY OF THE INVENTION

The aim of this invention is to achieve a totally new method and apparatus for the measurement of web tension.

The present invention is based on applying a curved surface, which has a row of holes aligned perpendicular to the web machine direction, close to the moving web surface. The air-cushion formed by the air carried along with web induces a pressure in the holes allowing the web tension to be determined from the pressures at the holes.

The present invention provides outstanding benefits. The web tension measurement method in accordance with the present invention neither imposes a load on the web nor requires an acute deflection of the web. The web machine direction will be deflected only by approx. 10° ... 15° at the gauging bar. The measurement method is accurate and by virtue of its sealed construction is insensitive to soiling or clogging. Further, common disturbance sources in an industrial plant such as noise and vibration do not influence the measurement results. Because the web tension is measured at several points over the cross direction of the web, the tension profile of the web can be determined.

BRIEF DESCRIPTION OF THE DRAWINGS

The present invention is next examined in greater detail with the help of the attached drawings, wherein.

DETAILED DESCRIPTION OF THE INVENTION

Figure 1A:
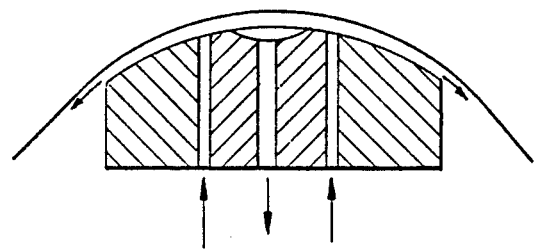
FIGS. 1a...1d show, as described above, applications based on conventional techniques.
Figure 1B:
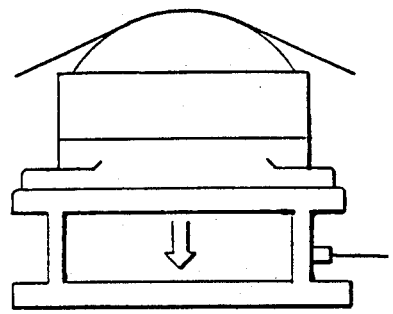
Figure 1C:
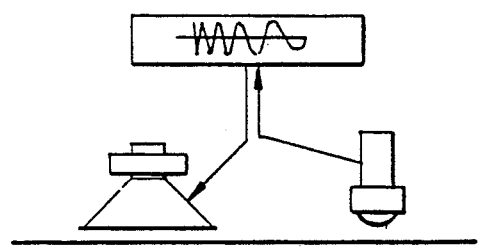
Figure 1D:
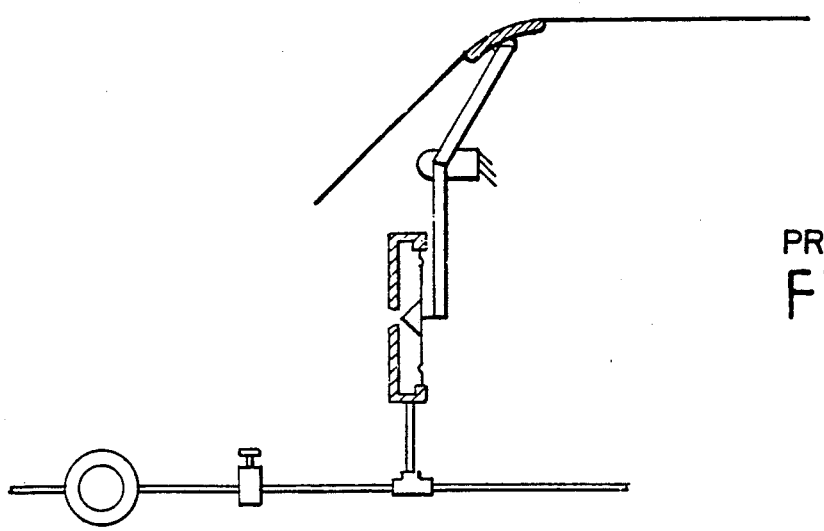
Figure 2:
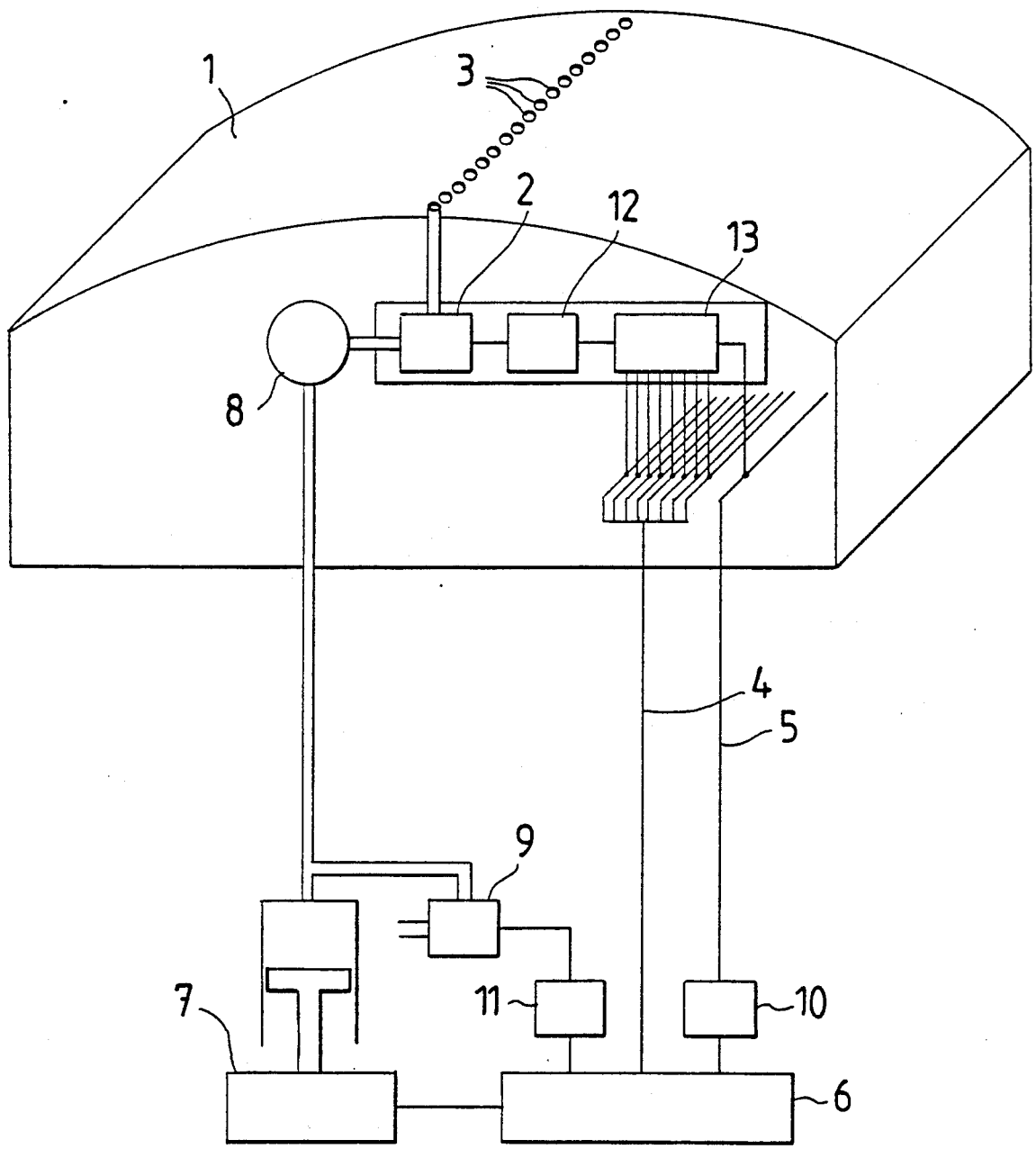
FIG. 2 shows a diagrammatic outline of an apparatus, which is capable of implementing the method in accordance with the present invention.

In accordance with FIG. 2, the measurement system according to the present invention comprises a gauging bar 1, measurement transducers 2, a measurement signal transmission channel 4, 5, an automatic data processing system 6, and a calibration system 7, 8, 9. In addition, the apparatus comprises signal converters 10, 11, 12, and a communications device 13 required for measurement signal transmission.

The gauging bar 1 is a bar fabricated of wear-resistant material extending over the entire width of a web 14. The web 14 is conveyed over the gauging bar 1 supported by the air cushion formed by the air conveyed with the web 14 and compressed between the bar 1 and the web 14. An air cushion with sufficient supporting capability will be formed in all but extreme run conditions. The radius of curvature at the surface of the bar 1 can be, for instance, 1 m. In order to increase the pressure exerted on the web by the air cushion, the radius of curvature can be decreased to some extent, possibly down to 20 cm with the resultant decrease in the floating height of the web 14 from the bar.

In a condition of balanced forces, the pressure induced by the air cushion between the web 14 and the bar 1 will be linearly proportional to the pressure imposed on the roll by the tension of the web 14. The pressure prevailing locally at different points of the air cushion, and thereby the tension profile, can be measured via holes 3 drilled through the bar 1, whereby an independent pressure transducer 2 is attached to each hole. In order to protect the transducer 2 from dust, a resilient protective foil capable of mediating the pressure is placed in the hole prior to the transducer. The measurement transducers 2 used are sensitive differential pressure transducers (e.g., with a range of 0 ... 25 mbar), which gauge the local pressure of the air cushion in relation to a reference pressure applied to the interior of the bar 1.

The measurement transducers 2 are integrated solid-state components, to which required electronic devices 12, 13, necessary for information transfer, are attached. Thus, each measurement point 3 is associated with an electronics block 2, 12, 13, integrally mounted to the bar 1 and indicated in FIG. 2 with an oblong rectangular frame. The voltage-current converter 12 converts the voltage signal normally available from the pressure differential transducer 2 into a current signal for a disturbance-free signal transmission. A multiplexer 13, either integral with the converter 12 or a separate construction, applies the current signal onto the measurement signal transmission channel 5 under control of the computer system 6.

The measurement results are transferred from the gauging bar using an analog signal transmission channel 5, capable of transferring one current signal, and a digital control channel 4. The computer system 6 addresses one transducer 2 at a time via the control channel 4, wherein the transducer sends its measurement results via the signal channel 5 to the computer system 6.

The measurement signal transmission channel 5 is terminated with an analog/digital converter 10, which converts the analog current signal from the addressable pressure transducer 2 into digital format for the use of the computer system 6.

The computer system 6 controls the operation of the measurement system, performs automatic calibration of the transducers 2, reads measurement signals, processes measurement data and prepares the tension profile information into a format suitable for the system operator.

The calibration system generates with the help of, e.g., a piston ram apparatus 7, a reference pressure for use by the reference pressure apparatus 8 of the pressure transducers. The reference pressure is held constant during the measurement. The reference pressure is gauged against the ambient pressure with the help of a separate pressure transducer 9, and the gauged information is forwarded to the computer system 6 via an analog/digital converter 11.

During calibration, gauging holes 3 of the gauging bar 1 are connected directly with ambient air, and the calibration system performs a sequenced alteration of the reference pressure making it possible for the computer system 6 to perform a separate pressure calibration for each of the pressure transducers 2.

Without parting from the scope of the method in accordance with the present invention, several alternative embodiments of the apparatus implementing the method can be conceived.

A possible cause for disturbance at the bar 1 will be imposed by dust released from the paper web that may enter the gauging holes 3. A simple method for alleviating this problem is to mount the gauging bar 1 above the web 14, whereby the dust entering the hole 3 will fall freely out from the hole. In addition, the gauging hole 3 can be formed so as to generate a slight turbulence which may further promote the detachment of dust from the hole walls. Alternatively, the gauging holes 3 can be covered with a membrane or filled with a porous material.

Figure 3A:
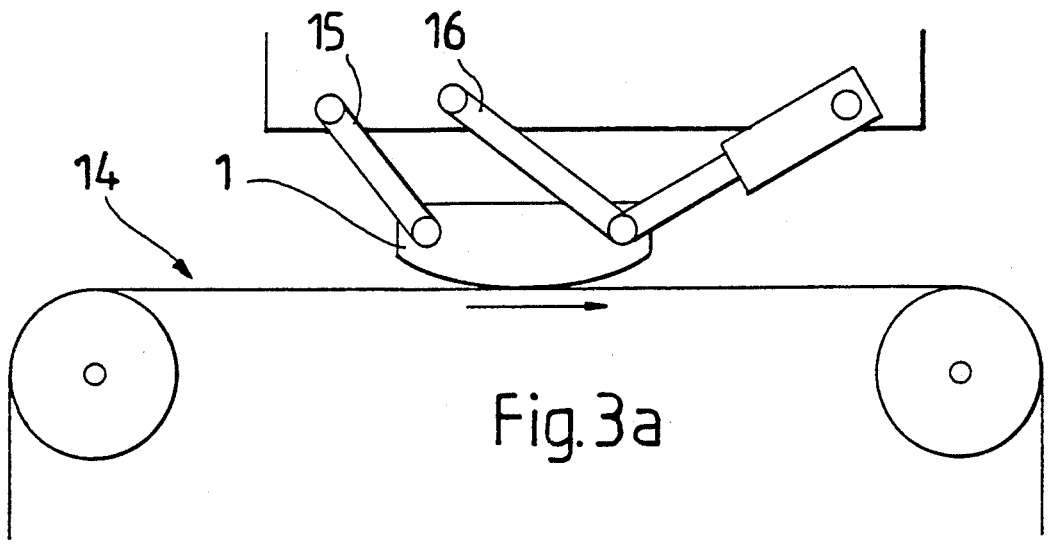
FIGS. 3a and 3b show different mounting methods for the gauging bar.
Figure 3B:
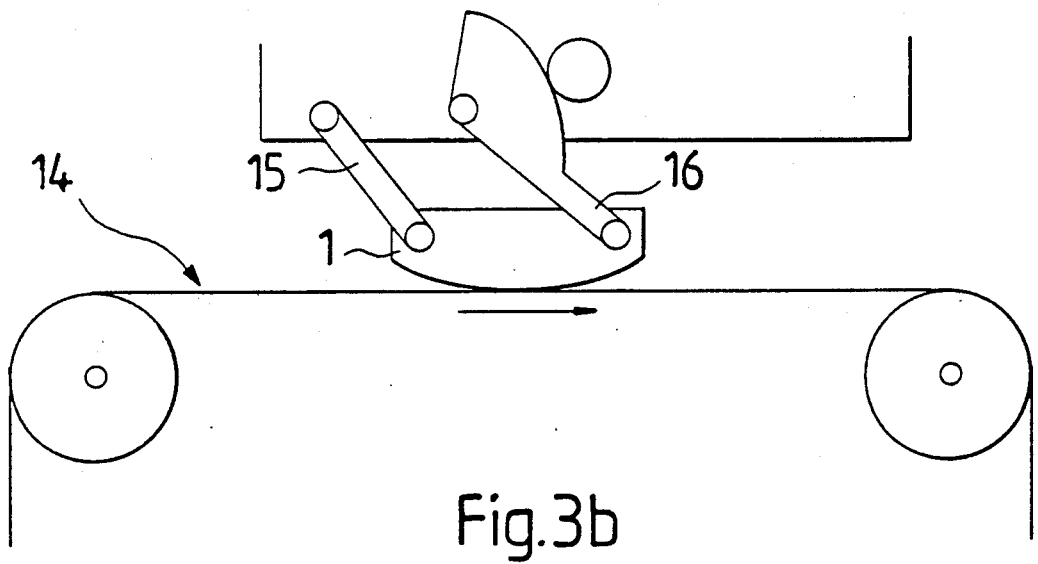

The gauging bar 1 can be mounted to be fixed or, alternatively movable as shown in FIGS. 3a and 3b.

The shape of the curved section of the gauging bar 1 facing the web 14 need not necessarily be circularly curved. Instead the surface can be combined from two or several circular section surfaces with different centers of curvature, from any other suitable curved surface shape, or even so that the leading edge of the bar 1 is straight and inclined to a proper angle with the web 14, while the trailing edge of the bar 1 is curved. The shaping of the bar surface must be designed with proper caution given to the pressure disturbances caused by the movement of the web at the leading and trailing edges of the gauging bar.

With the help of a movable gauging bar 1, the geometry of the location of the bar 1 can be optimized for different web speeds and tensions. In its optimum location, the width of the bar 1 extending over the machine direction of the web 14 must be as small as possible, yet still sufficiently wide to attenuate the pressure disturbances, which arise at the leading and trailing edges, from reaching up to gauging holes.

Figure 4:
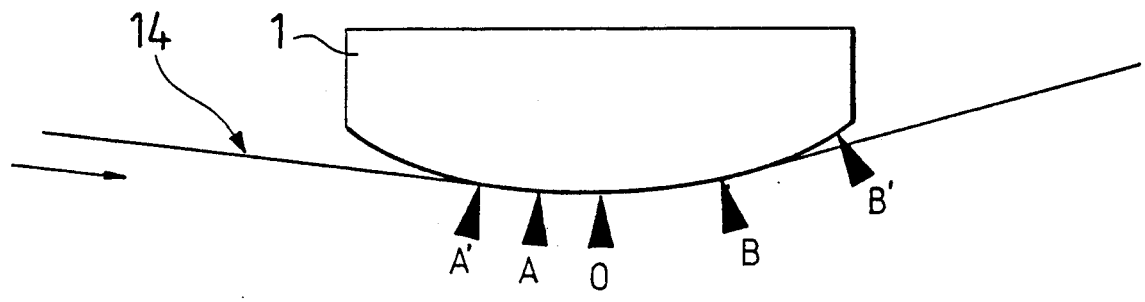
FIG. 4 shows in a diagrammatic form the optimum location of the gauging bar in relation to the web.

The pressure disturbance arising at the trailing edge of the bar with respect to the web 14 typically extends twice as far as the disturbance generated at the leading edge. Therefore, the optimal location of the bar 1 in regard with the web 14 has, as illustrated in FIG. 4, the distances selected to be approximately $OB = 2 \times OA$, where O is the gauging point, A is the meeting point of the web with the gauging bar and B is the exit point.

In order to maintain the optimum position described above, the bar 1 must be rotated slightly when being impressed onto the web 14 as illustrated in FIG. 3 with the different lengths of the support levers 15, 16 of the bar 1.

The depth of the impression of the bar 1 into the running web does not have any effect on the measurement results allowing the angle of web deflection to be freely selectable so as to obtain a desired meeting area of the bar 1 with the web 14.

The reference pressure necessary for the differential pressure transducers 2 can be generated with the help of several different methods. The required compressed air can be taken from, e.g., existing compressed-air network, whose working pressure is then reduced to a proper level using pressure reducers and regulators.

The transmission method of measurement signals used in the exemplifying the embodiment of the present invention can be replaced by a fully integrated digital data transfer system in which the transducers incorporate integral data transfer elements. This approach disposes of the separate analog/digital converters and the dedicated transfer channel for analog signal transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring the tension in a moving web utilizing a gauging bar with at least a partially curved outer surface which comprises applying the curved outer surface of said gauging bar into close proximity to the essentially straight surface of the moving web, wherein an air cushion is created in the gap between the moving web and the curved outer surface of said gauging bar, said air cushion being created by the air carried along with the moving web creating a pressure therebetween, and determining the web tension by measuring the pressure induced into said air cushion, said air cushion pressure being proportional to the tension in the moving web.

2. The method in accordance with claim 1, wherein the pressure is measured at several points aligned approximately linearly perpendicular to the machine direction of the moving web.

3. The method in accordance with claim 1, wherein the induced pressure is measured from the pressure difference between a reference pressure and the pressure induced between said gauging bar and the moving web.

4. The method of claim 1 wherein the curved outer surface of said gauging bar is provided with a plurality of holes which extend across the surface thereof, said pressure being created in said holes of said gauging bar.

5. An apparatus for measuring the tension of a moving web utilizing at least one pressure transducer for measuring ambient pressure, an automatic data processing system for processing the measurement of information and control of the measurement system operation and a signal transmission channel between the automatic data processing system and each pressure transducer for the transfer of the control and measurement of information, which comprises a gauging bar having a curved surface in the machine direction of the web, said gauging bar being provided with at least one hole in said surface, means for moving said gauging bar into close proximity to the moving web in order to form an air cushion between the web and said gauging bar, each said pressure transducer operatively communicating with each said hole of said gauging bar for measuring an air cushion pressure between the web and said gauging bar.

6. The apparatus in accordance with claim 5, wherein each said pressure transducer is a differential pressure sensor.

7. The apparatus in accordance with claim 5, wherein a calibration system is used for producing a stable pressure at a known level for comparing said stable pressure to said air cushion pressure induced between said gauging bar and the web.

8. The apparatus in accordance with claim 4, wherein said holes form a linear row which is aligned perpendicular with respect to the machine direction of the moving web.

9. The apparatus in accordance with claim 5, wherein each said hole of said gauging bar is covered with a resilient membrane.

10. The apparatus in accordance with claim 5, wherein said moving means are support levers which align said gauging bar into close proximity to the moving web.

11. The apparatus in accordance with claim 5, wherein each said hole is provided with a dedicated pressure transducer.

12. The apparatus of claim 5 wherein a plurality of holes extend across said surface of said gauging bar, and a plurality of transducers corresponding to said plurality of holes are operatively connected to said holes for measuring said air cushion pressure.

13. The apparatus in accordance with claim 5, wherein each said hole of said gauging bar is filled with a porous material.

* * * * *